United States Patent
Ye

(10) Patent No.: US 6,721,570 B2
(45) Date of Patent: Apr. 13, 2004

(54) METHOD FOR ALLOCATING CHANNEL AT BTS OF IMT-2000 SYSTEM

(75) Inventor: Jeong-Hwa Ye, Ichon-shi (KR)

(73) Assignee: Hyundai Electronics Industries Co., Ltd. (KR)

( * ) Notice: Subject to any disclaimer, the term of this patent is extended or adjusted under 35 U.S.C. 154(b) by 677 days.

(21) Appl. No.: 09/733,889

(22) Filed: Dec. 8, 2000

(65) Prior Publication Data

US 2002/0128015 A1 Sep. 12, 2002

(30) Foreign Application Priority Data

Dec. 30, 1999 (KR) ........................................ 1999-67503

(51) Int. Cl.[7] ................................................. H04Q 7/20
(52) U.S. Cl. ........................................ 455/450; 455/509
(58) Field of Search ............................... 455/450, 451, 455/452.1, 452.2, 464, 509

(56) References Cited

U.S. PATENT DOCUMENTS

| | | | | |
|---|---|---|---|---|
| 5,502,723 | A | 3/1996 | Sanders ........................ | 370/60.1 |
| 5,844,899 | A | 12/1998 | Daley et al. ................. | 370/342 |
| 6,018,521 | A | 1/2000 | Timbs et al. ................. | 370/342 |
| 6,034,950 | A | 3/2000 | Sauer et al. ................. | 370/328 |
| 6,041,050 | A | 3/2000 | Sanders ........................ | 370/352 |
| 6,049,543 | A | 4/2000 | Sauer et al. ................. | 370/395 |
| 6,081,721 | A | * 6/2000 | Suzuki et al. ............... | 455/450 |
| 6,115,370 | A | 9/2000 | Struhsaker et al. .......... | 370/342 |
| 6,456,849 | B1 | * 9/2002 | Purnadi et al. .............. | 455/453 |
| 6,466,795 | B1 | * 10/2002 | Ahn ............................. | 455/450 |
| 6,611,506 | B1 | * 8/2003 | Huang et al. ................ | 370/329 |
| 6,658,256 | B2 | * 12/2003 | Wille ........................... | 455/450 |

\* cited by examiner

*Primary Examiner*—Marsha D. Banks-Harold
*Assistant Examiner*—Nghi H. Ly
(74) *Attorney, Agent, or Firm*—Baker Botts LLP

(57) ABSTRACT

A method for allocating a channel at a BTS of an IMT-2000 system by using channel element information received from a call process block of a BSC (Base Station Controller) so as to allocate the channel element to the boards and to configure the allocated channel element information, is disclosed. The BTS includes a multi-user modulator (MUM), a multi-mode demodulator (MMD) and a combiner & channel decoder (CCD) boards. A storage area is generated to configure a linked list representing a relation between channel allocation information and each of the boards. The channel element allocation message is stored at the storage area and channel information is extracted from the stored channel element allocation message to analyze a sector ID of the channel element. A normal state of MUM, MMD and CCD boards are searched to allocate a channel at the searched MUM, MMD and CCD boards and rewrite the channel allocation information of the MUM, MMD and CCD boards. In case that a channel element mapping table representing the mapping relation betweens the boards is complete, a new channel information is stored at the liked list, and the allocated channel element information is transmitted to each of channel allocated boards.

6 Claims, 6 Drawing Sheets

METHOD FOR ALLOCATING CHANNEL AT BTS OF IMT-2000 SYSTEM

FIELD OF THE INVENTION

The present invention relates to a method of allocating a channel at a Base Station Transceiver System (BTS) of an international mobile telecommunication-2000 (IMT-2000) system in which one channel element is associated by a number of boards contained in the BTS, and, more particularly, to a method of allocating a channel at a BTS of an IMT-2000 system by using a channel element information received from a call process block of a Base Station Controller (BSC) so as to allocate the channel element to the boards and to configure the allocated channel element information.

DESCRIPTION OF THE PRIOR ART

In general, a number of Cell Site Modem (CSM) chips, each of which is called as a channel element and performs a modulation and demodulation function, is mounted on a channel card in the BTS of Code Division Multiple Access (CDMA) scheme of Personal Communication system (PCS) or Digital Cellular System (DCS). In the prior art of BTS, one CSM successfully performs one channel.

In case that the channel element is allocated at the call process block of the BSC, the channel element is allocated by using only the number of the channel element.

However, in a BTS of the IMT-2000 system, there is no the CSM called as the channel element. The concept of an individual channel element is changed to a concept of a user. That is, in order to make one channel element in the IMT-2000 system, a number of boards, i.e., a Multi-User Modulator (MUM), a Multi-Mode Demodulator (MMD) and a Combiner & Channel Decoder (CCD), have to be associated.

Accordingly, the prior art of the individual channel element scheme could not be directly adapted to the IMT-2000 system.

SUMMARY OF THE INVENTION

It is, therefore, a primary object of the invention to provide to a method of allocating a channel at a BTS (Base Station Transceiver System) of an IMT-2000 system by using a channel element information received from a call process block of a BSC (Base Station Controller) so as to allocate the channel element to a number of boards and to efficiently configure the allocated channel element information.

In accordance with the present invention, there is provided a method for allocating a channel at a base station Transceiver System (BTS) of an IMT-2000 system using a channel element allocation message received from a base station controller, the BTS including a multi-user modulator (MUM), a multi-mode demodulator (MMD) and a combiner & channel decoder (CCD) boards, said method comprising the steps of: (a) generating a storage area wherein the channel element allocation message is to be stored, and configuring a linked list representing a relation between channel allocation information and each of the boards; (b) storing, in case that the channel element allocation message has been received, the channel element allocation message and extracting channel information from the stored channel element allocation message to analyze a sector ID of the channel element; (C) searching a normal state of MUM board of the analyzed sector, allocating a channel at the searched MUM board and rewriting the channel allocation information of the MUM board; (d) searching a normal state of MMD board of the analyzed sector, allocating a channel at the searched MMD board and rewriting the channel allocation information of the MMD board; (e) searching a normal state of CCD board of the analyzed sector, allocating a channel at the searched CCD board and rewriting the channel allocation information of the CCD board; and (f) determining whether a channel element mapping table representing the mapping relation between the MUM, MMD and CCD boards is complete or not, and, storing, in case that the channel element mapping table is complete, a new channel information at said liked list, and transmitting the channel element information to each of channel allocated MUM, MMD and CCD boards.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

A preferred embodiment of the present invention will now be described in detail, with reference to the accompanying drawings.

Figure 1:
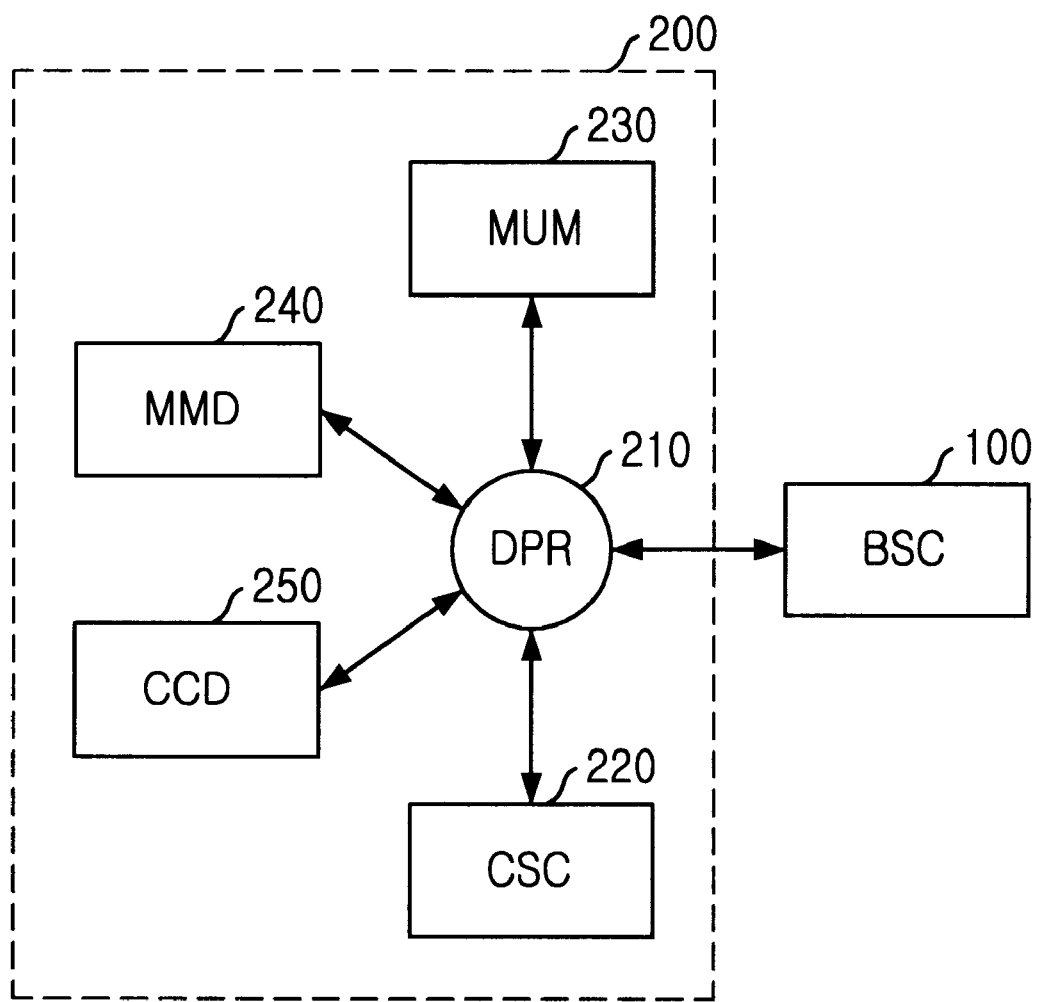
FIG. 1 is a schematic diagram of a BTS (Base Station Transceiver System) at an IMT-2000 system in which there is performed a channel allocation method in accordance with one embodiment of the present invention.
Figure 2A:
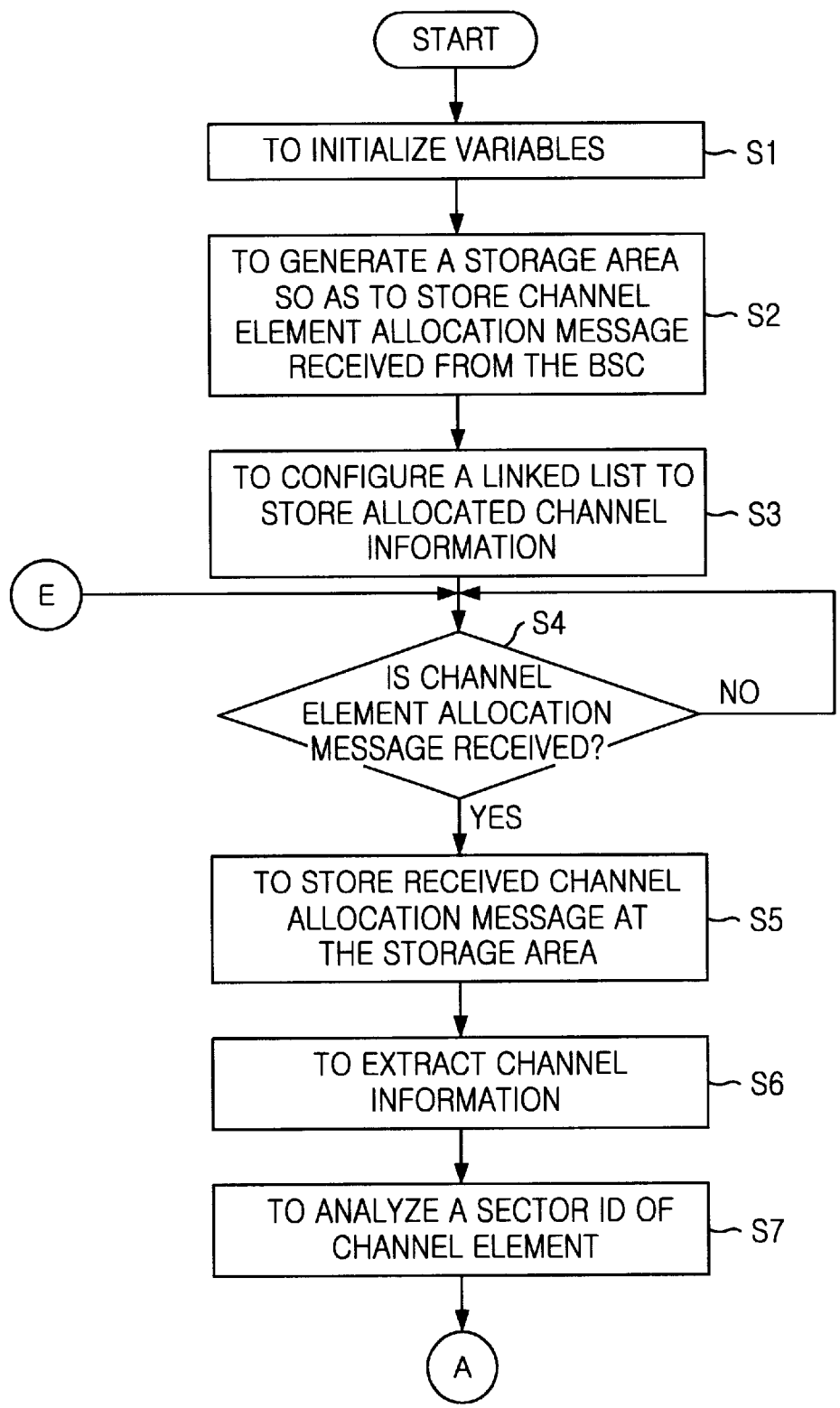
FIGS. 2A to 2E show a flowchart illustrating a method of channel allocation method in accordance with one embodiment of the present invention.
Figure 2B:
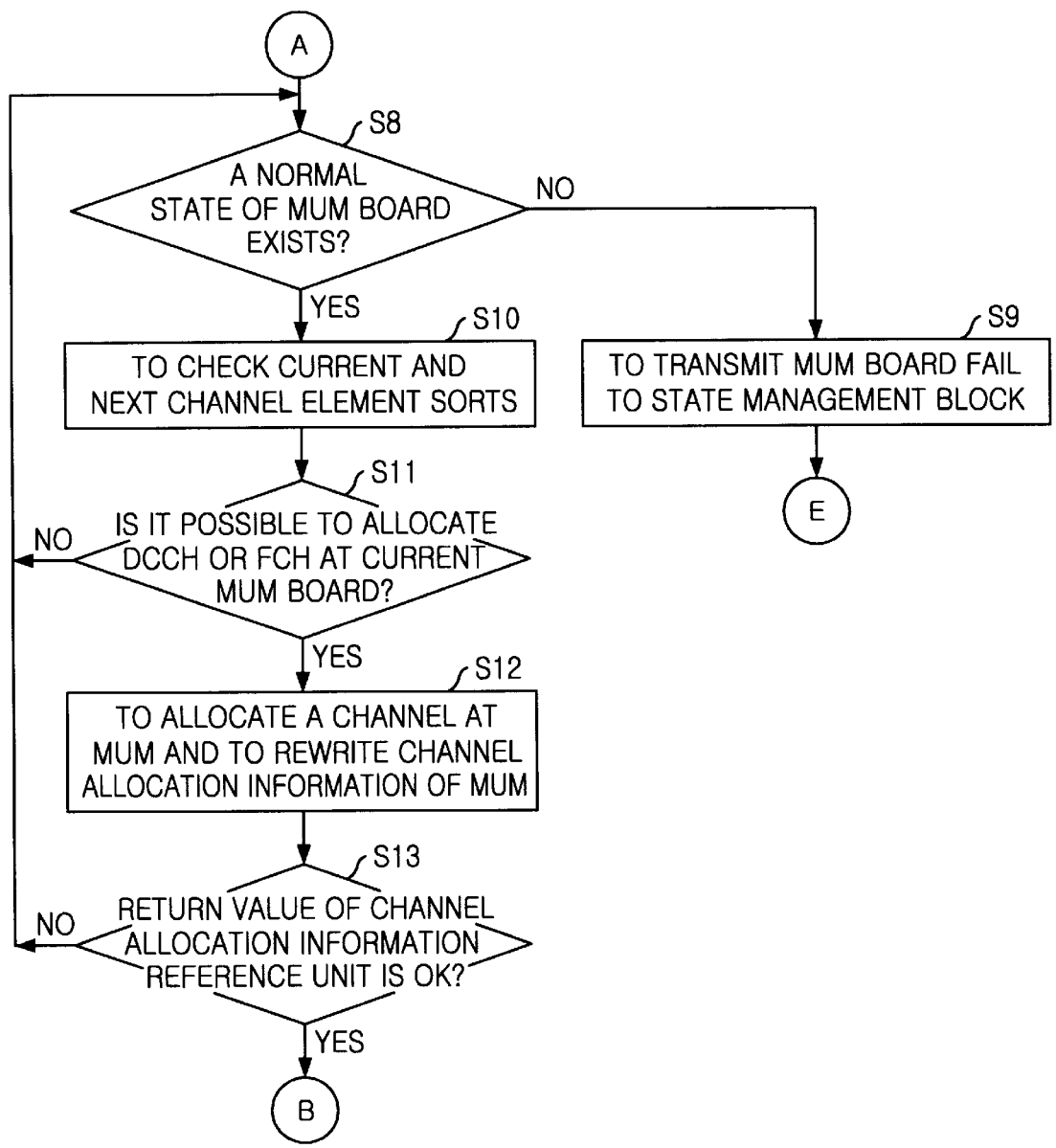
Figure 2C:
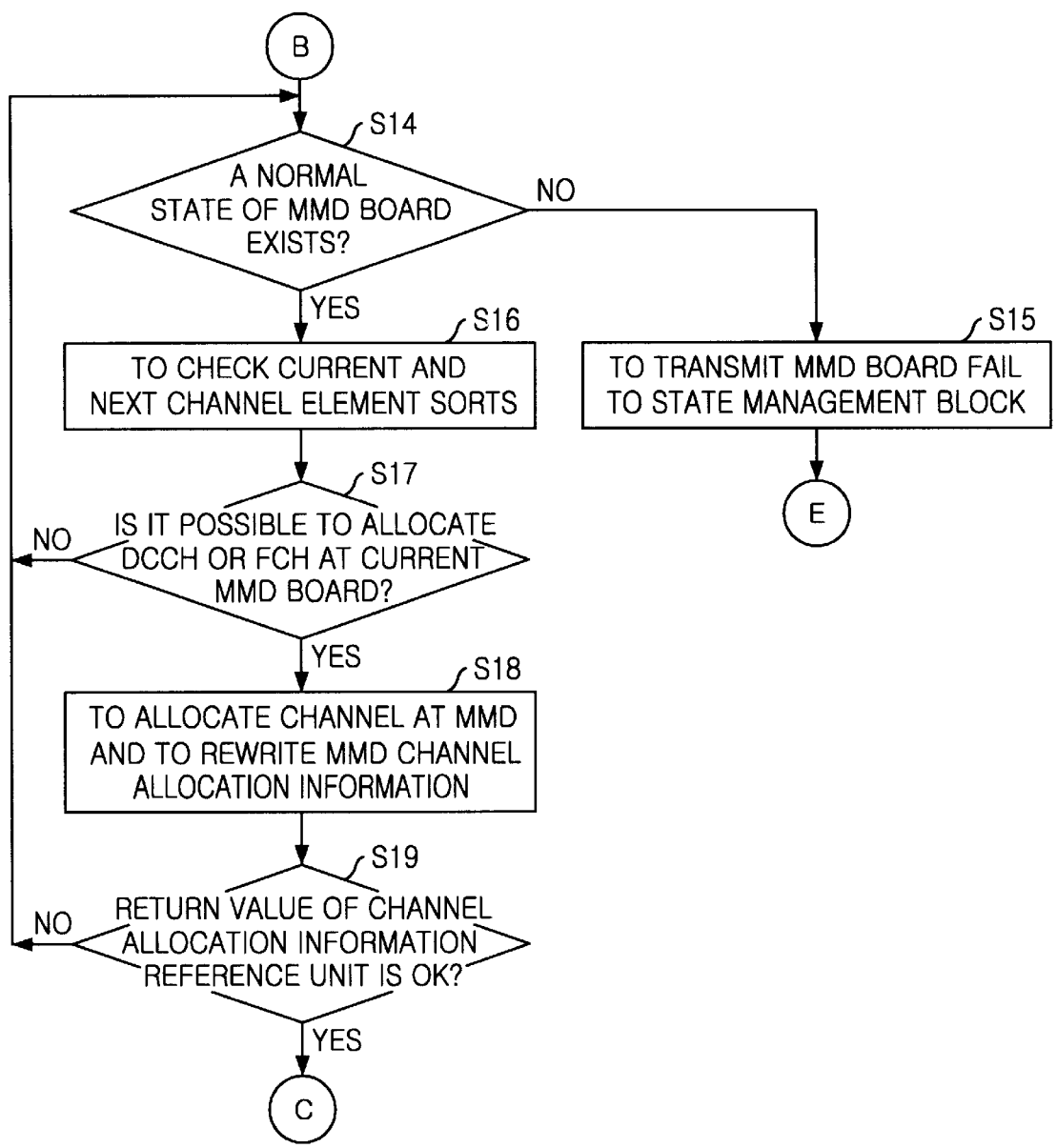
Figure 2D:
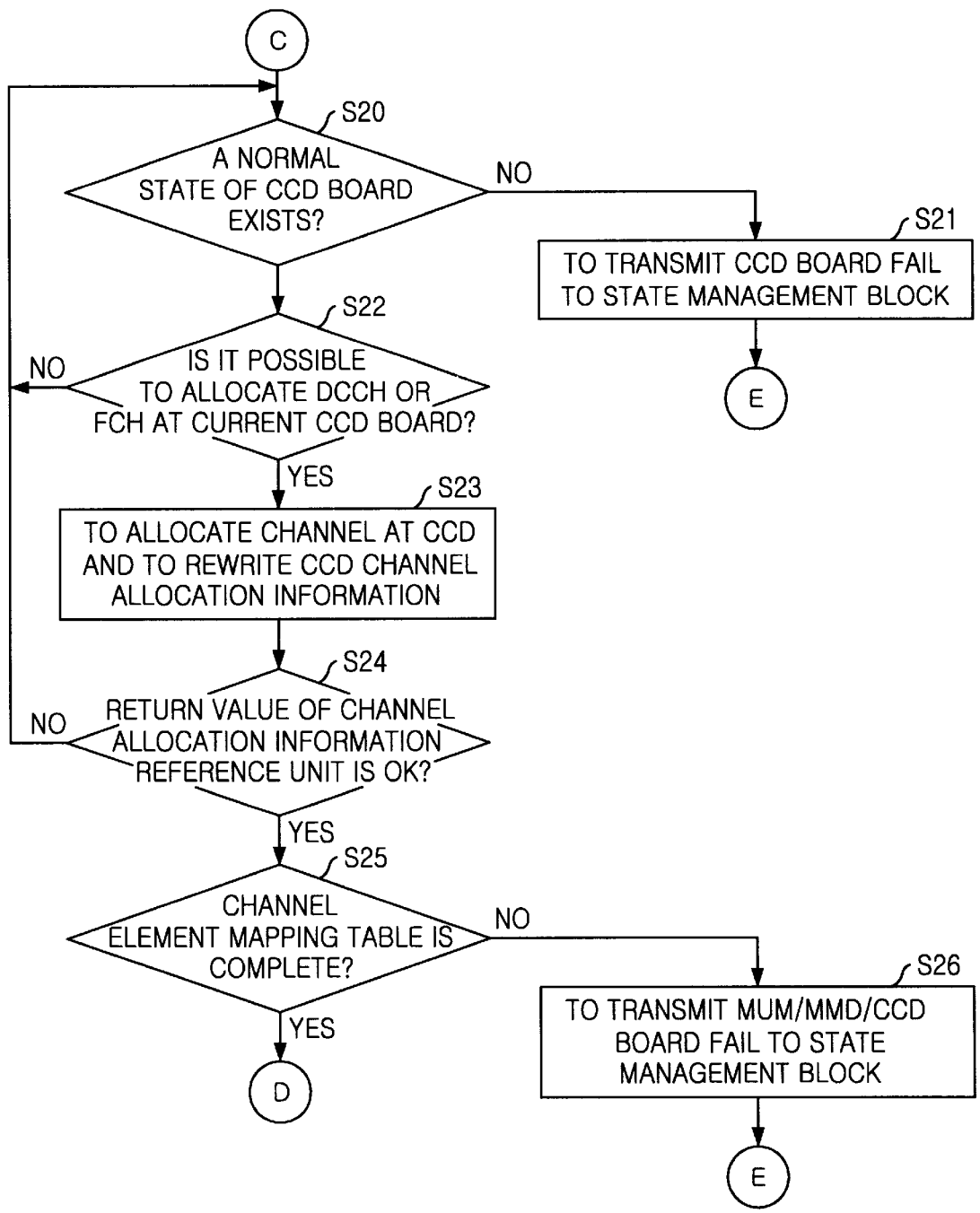
Figure 2E:
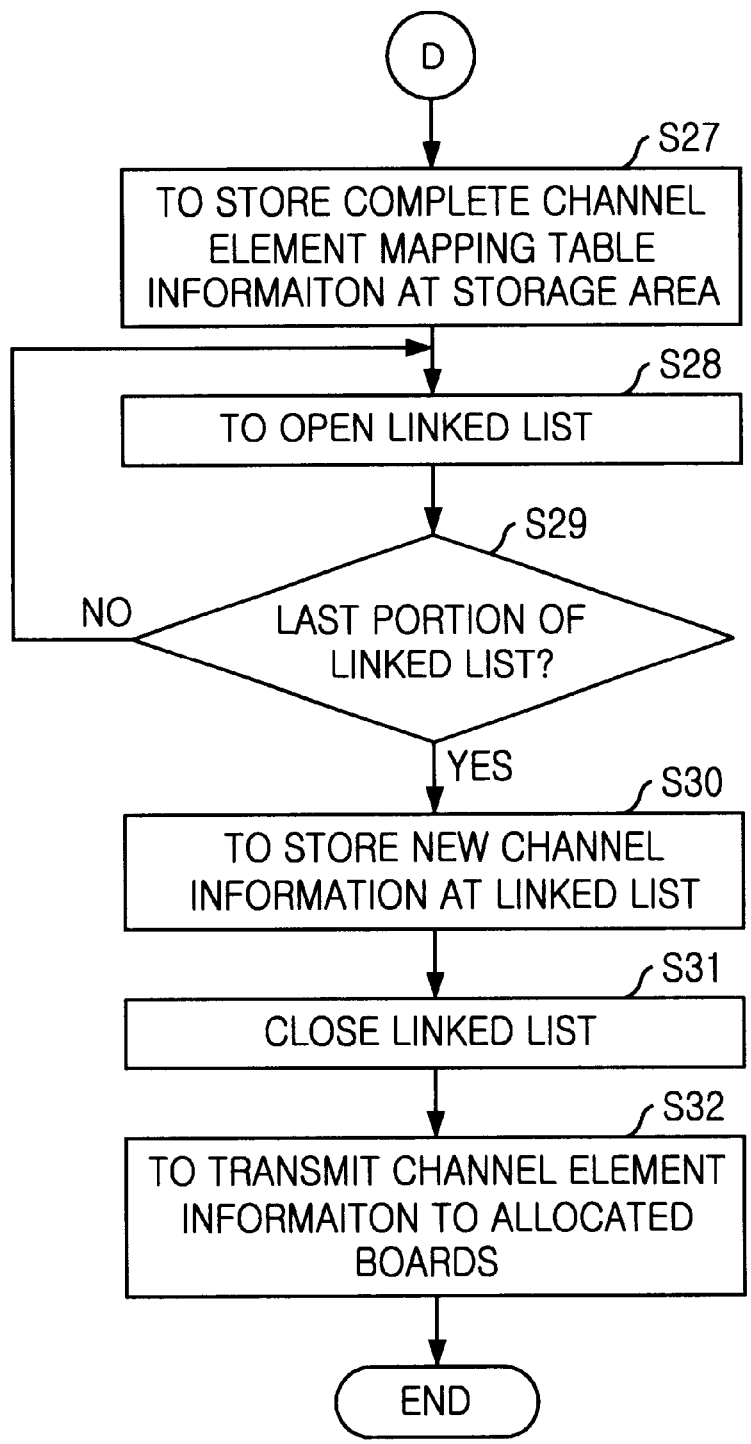

FIG. 1 is a schematic diagram of a BTS (Base Station Transceiver System) at an IMT-2000 system in which there is performed a channel allocation method in accordance with one embodiment of the present invention.

As shown in FIG. 1, the BTS 200 in which the channel allocation is performed, is connected to a BSC 100. According to channel element information provided from a call process block (not shown) of the BSC 100, the channel allocation is accomplished in the BTS 200.

The BTS 200 comprises a data packet router (DPR) 210, a cell site controller (CSC) 220, a multi-user modulator (MUM) 230, a multi-mode demodulator (MMD) 240 and a combiner & channel decoder 250.

The DPR 210 is established to interface packet data with the BSC 100.

The CSC 220 manages all of operations of the BTS 200.

The MUM 230 modulates and spreads a signal message, a control message and a traffic information signal to provide the modulated and spread signal to a mobile station. In addition, one MUM 230 simultaneously contains eight Dedicated Control Channels (DCCH), eight Fundamental Channels (FCH) and eight number of Supplemental Channels (SCH).

The MMD 240 receives the signal message, a control message and a traffic information signal from the mobile station and demodulates and inverse-spreads the received signals to transmit the demodulated and inverse-spread signal to the CCD 250. One number of MMD contains one number of DCCH, one number of FCH and two SCHs.

The CCD 250 associates the received data from the MMD 240 and decodes the associated data. One CCD simultaneously contains channels regardless of the sort of the channel element.

Hereinafter, the channel allocation method performed at the described BTS 200 is illustrated with reference to FIGS. 2A to 2E.

The process of the BTS channel allocation is performed at the CSC 220 of the BTS 200.

In step S1, all of variables are initialized. And then, in step S2, a storage area is generated so as to store the channel element allocation message provided from the call process block of the BSC 100. In step S3, a linked list representing the information of MUM, MDM and CCD boards mapping with the final allocated channel element is configured so as to store allocated channel element information. The channel element information to be stored at the storage area, comprises a channel element ID, a sector information to which the channel element is classified, a sort of the channel element, a user call ID using a current allocated channel element, addresses of MUM, MDM and CCD boards mapping with the allocated channel element.

In step S4, it is determined whether the channel element message has been received from the call process block of the BSC 100. In case that the channel element message has not been received from the call process block of the BSC 100, the reception of the channel element message is waited. In case that the channel element message has been received from the call process block of the BSC 100, the process proceeds to step S5.

In step S5, the received channel element allocation message is stored at the storage area. And then, in step S6, channel information, which is necessary to configure channel element mapping table, is extracted from the channel element allocation message stored at the storage area. The channel information necessary to configure channel element mapping table is a channel element ID, a sector information to which the channel element is classified, a sort of the channel element, a user call ID using a current allocated channel element, etc.

And then, in step S7, a sector ID to which the channel element is classified, is analyzed. Thereafter, in step S8, it is determined that a normal state of the MUM board of a corresponding sector exists or not. In case that the normal state of the MUM board does not exist, the process proceeds to step S9. In step S9, MUM board fail information is provided to a state management block. And then, the process returns to Step S4. On the other hand, in case that the normal state of the MUM board exists, a current channel element sort and a next channel element sort are checked in step S10.

Thereafter, in step S11, it is determined that it is possible to allocate the DCCH or FCH at the current MUM board. In case that it is impossible to allocate the DCCH or FCH at the current MUM board, the process returns to Step S8. In case that it is possible to allocate the DCCH or FCH at the current MUM board, a channel is allocated at the MUM board and the channel allocation information of the MUM is revised in step S12.

And then, in step S13, it is determined that a return value of the channel allocation information reference unit is OK or not. In case that the return value of the channel allocation information reference unit is not OK, the process returns to S8. In case that the return value of the channel allocation information reference unit is OK, the process proceeds to step S14.

In step S14, it is determined whether a normal state of the MMD board of a corresponding sector exists or not. In case that the normal state of the MMD board does not exist, the process proceeds to step S15. In step S15, MMD board fail information is provided to the state management block. And then, the process returns to step S4. On the other hand, in case that the normal state of the MMD board exists, the current channel element sort and the next channel element sort are checked in step S16.

Thereafter, in step S17, it is determined that it is possible to allocate the DCCH or FCH at the current MMD board. In case that it is impossible to allocate the DCCH or FCH at the current MMD board, the process returns to Step S14. In case that it is possible to allocate the DCCH or FCH at the current MMD board, a channel is allocated at the MMD board and the MMD channel allocation information is revised in step S18.

And then, in step S19, it is determined that a return value of the channel allocation information reference unit is OK or not. In case that the return value of the channel allocation information reference unit is not OK, the process returns to S14. In case that the return value of the channel allocation information reference unit is OK, the process proceeds to step S20.

In step S20, it is determined whether a normal state of the CCD board exists or not. In case that the normal state of the CCD board does not exist, the process proceeds to Step S21. In step S21, a CCD board fail information is provided to the state management block. And then, the process returns to Step S4. On the other hand, in case that the normal state of the CCD board exists, in step S22, it is determined whether it is possible to allocate the DCCH or FCH at the current CCD board. In case that it is impossible to allocate the DCCH or FCH at the current CCD board, the process returns to Step S20. In case that it is possible to allocate the DCCH or FCH at the current CCD board, a channel is allocated at the CCD board and the CCD channel allocation information is revised in step S23.

And then, in step S24, it is determined that a return value of the channel allocation information reference unit is OK or not. In case that the return value of the channel allocation information reference unit is not OK, the process returns to S20. In case that the return value of the channel allocation information reference unit is OK, the process proceeds to step S25.

In step S25, it is determined whether the channel element mapping table is complete or not. In case that the channel element mapping table is not complete, the process proceeds to Step S26. In step 26, MUM, MMD and CCD board fail information is provided to the state management block. And then, the process returns to Step S4.

In case that the channel element mapping table is complete, in step S27, the complete channel element mapping table information is stored at the storage area.

Thereafter, in step S28, the linked list is opened. And then, in step S29, it is determined whether a current portion is the last of the linked list. In case that the current portion is not the last of the linked list, the process proceeds to step S28. In case that the current portion is the last portion of the linked list, the process proceeds to step S30. In step S30, new allocated channel element information is stored at the storage area. And then, in step S31, the opened linked list is closed. In step S32, the allocated channel information and all of channel allocation messages provided from the call process block of the BSC 100 are transmitted to the MUM, MMD and CCD boards mapped with the channel allocated at the call process block of the BSC 100 are transmitted to the MUM, MMD and CCD boards mapped with the channel allocation message from the call process block of the BSC 100.

As described above, in accordance with the present invention, a channel at a BTS of an IMT-2000 system is efficiently allocated based on the channel element information received from a call process block of a BSC through the use of the linked list.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for allocating a channel at a base station Transceiver System (BTS) of an IMT-2000 system using a channel element allocation message received from a base station controller, the BTS including a multi-user modulator (MUM), a multi-mode demodulator (MMD) and a combiner & channel decoder (CCD) boards, said method comprising the steps of:

(a) generating a storage area wherein the channel element allocation message is to be stored, and configuring a linked list representing a relation between channel allocation information and each of the boards;

(b) storing, in case that the channel element allocation message has been received, the channel element allocation message and extracting channel information from the stored channel element allocation message to analyze a sector ID of the channel element;

(c) searching a normal state of MUM board of the analyzed sector, allocating a channel at the searched MUM board and rewriting the channel allocation information of the MUM board;

(d) searching a normal state of MMD board of the analyzed sector, allocating a channel at the searched MMD board and rewriting the channel allocation information of the MMD board;

(e) searching a normal state of CCD board of the analyzed sector, allocating a channel at the searched CCD board and rewriting the channel allocation information of the CCD board; and (f) determining whether a channel element mapping table representing the mapping relation betweens the boards is complete or not, and, storing, in case that the channel element mapping table is complete, a new channel information at the liked list, and transmitting the allocated channel element information to each of channel allocated boards.

2. The method as recited in claim 1, wherein the step(c) includes the steps of:

determining whether a normal state of the MUM board among the MUM boards corresponding to the sector exists or not;

providing, in case that the normal state of the MUM board does not exist, an MUM board fail information to a state management block;

selecting, in case that the normal state of the MUM board exists, the MUM board to check a current channel element sort and a next channel element sort;

determining whether it is possible to allocate a DCCH or a FCH at the current MUM board; and allocating, in case that it is possible to allocate the DCCH or the FCH at the current MUM board, a channel at the MUM board and revising the MUM channel allocation information, and transmitting the channel allocation result information to the state information reference block of each of the boards.

3. The method as recited in claim 1, wherein the step (d) includes the steps of:

determining whether a normal state of the MMD board among the MMD boards corresponding to the sector exists or not;

providing, in case that the normal state of the MMD board does not exist, an MMD board fail information to the state management block;

selecting, in case that the normal state of the MMD board exists, the MMD board to check a current channel element sort and a next channel element sort;

determining whether it is possible to allocate the DCCH or the FCH at the current MMD board; and allocating, in case that it is possible to allocate the DCCH or the FCH at the current MMD board, a channel at the MMD board, revising the MMD channel allocation information, and transmitting the channel allocation result information to the state information reference block of each of the boards.

4. The method as recited in claim 1, wherein the step (e) includes the steps of:

determining whether a normal state of the CCD board among the CCD boards exists or not;

providing, in case that the normal state of the CCD board does not exist, a CCD board fail information to a state management block;

determining, in case that the normal state of the CCD board exists, whether it is possible to allocate a DCCH or a FCH at the normal CCD board; and allocating, in case that it is possible to allocate the DCCH or the FCH at the current CCD board, a channel at the CCD board and revising the CCD channel allocation information, and transmitting the channel allocation result information to the state information reference block of each of the boards.

5. The method as recited in claim 1, wherein the step (f) includes the steps of:

determining whether the channel element mapping table is complete or not;

transmitting, in case that the channel element mapping table is not complete, MUM, MMD and CCD board fail information to the state management block;

storing, in case that the channel element mapping table is complete, the complete channel element mapping table is stored at the storage area opening the linked list;

determining whether a current portion is the last of the linked list;

storing, in case that the current portion is the last portion of the linked list, a new allocated channel element information at the storage area;

closing the opened linked list; and providing the allocated channel information and all of channel allocation messages provided from the BSC to the MUM, MMD and CCD boards mapped with the channel allocated at the call process block of the BSC.

6. The method as recited in claim 5, wherein the information stored at the storage area contains a channel element ID, a sector information to which the channel element is classified, a sort of the channel element, a user call ID using a current allocated channel element, addresses of the MUM, the MDM and the CCD boards mapping with the current allocated channel element.

* * * * *